United States Patent
Yanase et al.

(10) Patent No.: US 7,341,501 B2
(45) Date of Patent: Mar. 11, 2008

(54) GEAR GRINDING MACHINE, METHOD FOR DRESSING THREADED GRINDING WHEEL AND METHOD FOR GRINDING WORK

(75) Inventors: Yoshikoto Yanase, Ritto (JP); Toshifumi Katsuma, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/638,542

(22) Filed: Dec. 14, 2006

(65) Prior Publication Data

US 2007/0202774 A1 Aug. 30, 2007

(30) Foreign Application Priority Data

Feb. 28, 2006 (JP) .............................. 2006-052574

(51) Int. Cl.
*B24B 49/00* (2006.01)
(52) U.S. Cl. .............................. 451/5; 451/10; 451/11; 451/47; 451/56; 451/147; 451/253; 451/443; 451/900
(58) Field of Classification Search .................... 451/5, 451/10, 11, 47, 56, 147, 219, 222, 253, 443, 451/900
See application file for complete search history.

(56) References Cited

U.S. PATENT DOCUMENTS

| | | | | |
|---|---|---|---|---|
| 5,076,020 A | * | 12/1991 | Negri | 451/21 |
| 5,738,569 A | * | 4/1998 | Mackowsky | 451/56 |
| 6,217,409 B1 | * | 4/2001 | Stadtfeld et al. | 451/5 |
| 6,290,574 B1 | * | 9/2001 | Thyssen | 451/9 |
| 7,083,496 B2 | * | 8/2006 | Yanase et al. | 451/5 |
| 7,198,543 B2 | * | 4/2007 | Yanase et al. | 451/5 |

FOREIGN PATENT DOCUMENTS

| | | |
|---|---|---|
| JP | 2004-144148 A | 5/2004 |
| JP | 2006-26789 A | 2/2006 |

* cited by examiner

*Primary Examiner*—Eileen P. Morgan
(74) *Attorney, Agent, or Firm*—Birch, Stewart, Kolasch & Birch, LLP

(57) ABSTRACT

A gear grinding machine, a method for dressing a threaded grinding wheel, and a method for grinding a work are disclosed. A dressing tool is rotated in a vertical plane, with its position being fixed. The position of a threaded grinding wheel is NC-controlled, whereby the dressing tool is brought into contact with the starting point of the thread of the threaded grinding wheel at a somewhat lower surface of the circumferential surface of the threaded grinding wheel and, in accordance with the rotation of the threaded grinding wheel, the position of contact of the dressing tool with the threaded grinding wheel is moved along the circumferential surface of the threaded grinding wheel.

4 Claims, 6 Drawing Sheets

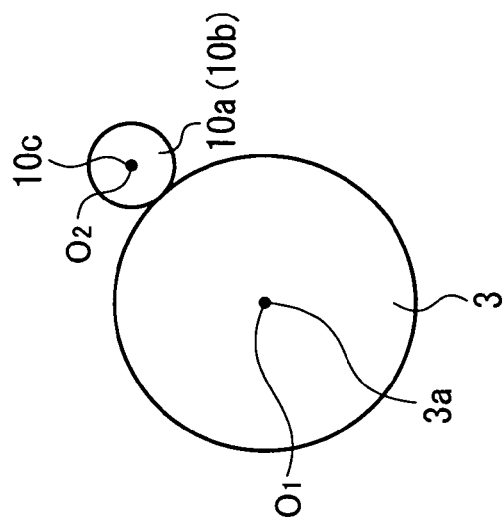
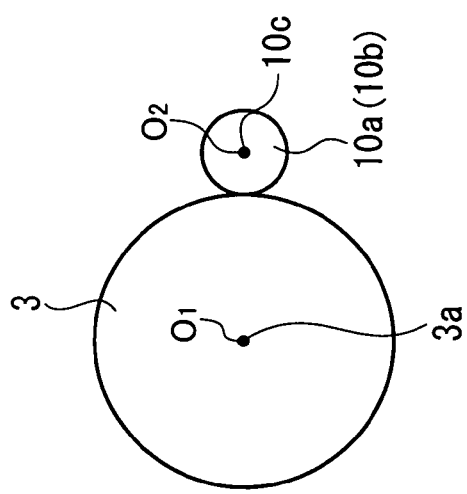
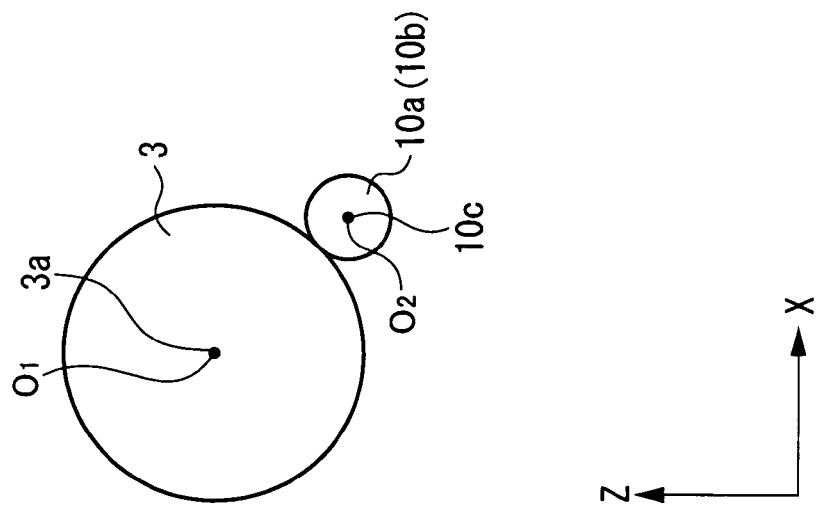

GEAR GRINDING MACHINE, METHOD FOR DRESSING THREADED GRINDING WHEEL AND METHOD FOR GRINDING WORK

BACKGROUND OF THE INVENTION

1. Field of the Invention

This invention relates to a gear grinding machine equipped with a threaded grinding wheel for performing grinding, and a rotary dressing device for dressing the threaded grinding wheel, a method for dressing a threaded grinding wheel, and a method for grinding a work.

That is, the present invention is arranged to control the position of the threaded grinding wheel optimally by a numerical control (hereinafter referred to as NC control) function provided in the gear grinding machine so that the wheel pressure angle of the threaded grinding wheel can be easily dressing-modified, and the work can be ground by the dressing-modified threaded grinding wheel.

In further detail, the present invention performs the following processing by effectively using an NC control function provided inherently in a gear grinding machine equipped with a rotary dressing device: That is, the present invention easily carries out dressing capable of progressively changing (gradually increasing or gradually decreasing) the wheel pressure angle of a thread, which is formed spirally on the circumferential surface of the threaded grinding wheel, along a spiral path beginning at the starting point of the thread toward the endpoint of the thread. The work can be ground using the thus dressed threaded grinding wheel.

The term "starting point of the thread" refers to one end of the spiral of the thread formed in a spiral shape. The term "end point of the thread" refers to the other end of the spiral of the thread formed in a spiral shape.

2. Description of the Related Art

A gear grinding machine, in which a gear (workpiece or work) after heat treatment is ground by "a threaded grinding wheel", a gear grinding tool, to finish the gear, has so far been known. The threaded grinding wheel is an annular grinding wheel having a thread (rack tooth) formed spirally on its outer peripheral surface. Grinding is performed, with the positions in an orthogonal coordinate system (positions on the X-axis, Y-axis and Z-axis) of the threaded grinding wheel, the rotational speed of the threaded grinding wheel, and so on being NC-controlled.

As grinding proceeds, the threaded grinding wheel wears, and its sharpness decreases. Thus, after the threaded grinding wheel has ground many gears continuously, the worn-out threaded grinding wheel needs to be dressed by a dressing device to regenerate a sharp cutting edge.

One of the types of gear grinding machines is a gear grinding machine equipped with a dressing device. The dressing device includes a rotary dressing device provided with a rotationally driven disk-shaped dressing tool. With this rotary dressing device, the disk-shaped dressing tool is kept rotationally driven in a vertical plane, and this dressing tool during rotation is brought into contact with the flanks of the thread of the threaded grinding wheel being rotated, thereby carrying out dressing.

To modify the tooth profile pressure angle of the gear as an object to be ground, the wheel pressure angle of the threaded grinding wheel has to be modified as a precondition. Modification of the wheel pressure angle of the threaded grinding wheel is made by dressing the threaded grinding wheel by the dressing device.

That is, (1) the threaded grinding wheel is dressed by the dressing device to modify its wheel pressure angle;

(2) the gear is ground by the threaded grinding wheel having the modified wheel pressure angle to finish the gear, whereby the "modified wheel pressure angle" formed in the threaded grinding wheel is transferred to the gear; and (3) the result is obtained that the tooth profile pressure angle of the gear is modified.

To modify the wheel pressure angle of the threaded grinding wheel, it suffices to turn (turn about a vertical axis (Z-axis)) the disk-shaped dressing tool in contact with the thread of the threaded grinding wheel.

Among gear grinding machines, therefore, are those of the type having a mechanism for turning the rotary dressing device. With the gear grinding machine having such a turning mechanism, an operator manually turns the rotary dressing device (dressing tool) about the Z-axis by use of a block gauge, which is a tool for turning, to modify the wheel pressure angle.

Gears are used to transmit a rotating force, and the engagement of the gears may result in gear noises (noises and vibrations). Thus, crowning (rounding) is applied in the direction of the tooth trace of the gear (helical gear) to smooth contact between the gears for a gentle touch, thereby reducing gear noises.

When crowning is applied in the tooth trace direction of the helical gear by a generating gear grinding machine, the tooth profile changes according to the position of the face-width. The profile in this case is called a bias tooth flank. With the generating gear grinding machine, a bias-in profile is formed in which the pressure angle on the acute-angle side of the helical gear is large.

The shape of the tooth flank of the helical gear affects gear noises, thus creating need for arbitrary control of the amount of the bias imparted to the tooth flank (namely, need for modification of the bias tooth flank). This need is great, particularly, with tooth flank grinding in the finishing step. However, modification of the bias tooth flank is difficult with the current gear grinding machine.

Under these circumstances, the inventor conducted studies with the expectation that the bias tooth flank of a helical gear would be modified by grinding the helical gear with the use of a threaded grinding wheel. To modify the bias tooth flank of a helical gear by grinding the helical gear with the use of a threaded grinding wheel, it is sufficient that the wheel pressure angle of a thread, which is formed spirally on the circumferential surface of the threaded grinding wheel, progressively changes (gradually increases or gradually decreases) along a spiral path beginning at the starting point of the thread (one end of the spiral of the thread formed in a spiral shape) toward the end point of the thread (the other end of the spiral of the thread formed in a spiral shape)

Thus, it suffices to dress the threaded grinding wheel, thereby "progressively changing (gradually increasing or gradually decreasing) the wheel pressure angle of a thread, which is formed spirally on the circumferential surface of the threaded grinding wheel, along a spiral path beginning at the starting point of the thread toward the end point of the thread."

As described earlier, to modify the wheel pressure angle of the threaded grinding wheel, it is advisable to turn (turn about the vertical axis (Z-axis)) the disk-shaped dressing tool in contact with the thread of the threaded grinding wheel.

Hence, "in order to dress the threaded grinding wheel, thereby progressively changing (gradually increasing or gradually decreasing) the wheel pressure angle of a thread, which is formed spirally on the circumferential surface of the threaded grinding wheel, along a spiral path beginning at the starting point of the thread toward the end point of the thread", as mentioned above, it is recommendable to exercise control such that the angle of turning of the dressing tool about the Z-axis is progressively changed (gradually increased or gradually decreased) as the threaded grinding wheel is rotated.

To exercise control such that the angle of turning of the dressing tool about the Z-axis is progressively changed, however, a new function of control for turning about the turning axis has to be introduced into the gear grinding machine. The addition of the new turning control function for turning the dressing tool about the Z-axis to the current gear grinding machine has actually posed severe difficulty.

The present invention has been accomplished in light of the above-described problems. An object of the present invention is to provide a gear grinding machine, a method for dressing a threaded grinding wheel, and a method for grinding a work, which enable a current gear grinding machine equipped with a rotary dressing device to perform the following function without changing the position of a dressing tool: "dressing the threaded grinding wheel, thereby progressively changing (gradually increasing or gradually decreasing) the wheel pressure angle of a thread, which is formed spirally on the circumferential surface of the threaded grinding wheel, along a spiral path beginning at the starting point of the thread toward the end point of the thread".

SUMMARY OF THE INVENTION

A first aspect of the present invention is a gear grinding machine, comprising:

a moving mechanism on which a threaded grinding wheel having a thread spirally formed on an outer peripheral surface thereof is rotatably mounted, the moving mechanism being arranged to move the threaded grinding wheel along an X-direction being a direction in which the threaded grinding wheel moves toward and away from a work grinding position, a Z-direction being a vertical direction, and a Y-direction being a direction perpendicular to the X-direction and the Z-direction, and being also arranged to turn the threaded grinding wheel in a Y-Z plane;

an NC device for NC-controlling movement of the moving mechanism in order to control a position of the threaded grinding wheel mounted on the moving mechanism; and a rotary dressing device having a disk-shaped dressing tool, and arranged such that when the dressing tool is set at the work grinding position, the dressing tool contacts flanks of the thread of the threaded grinding wheel, while being rotationally driven, to perform dressing, wherein the NC device exercises control in such a manner as to adjust positions of the threaded grinding wheel in the X-direction, the Y-direction and the Z-direction, and a turning position of the threaded grinding wheel in the Y-Z plane such that the dressing tool contacts the flanks of the thread of the threaded grinding wheel, move the threaded grinding wheel in the Y-direction by a distance corresponding to a lead of the spiral thread during one rotation of the threaded grinding wheel while keeping a state of contact of the dressing tool with the flanks of the thread of the threaded grinding wheel, and progressively change the positions of the threaded grinding wheel in the X-direction and the Z-direction such that a position of contact of the dressing tool with the flanks of the thread of the threaded grinding wheel progressively moves along a circumferential surface of the threaded grinding wheel in accordance with the rotation of the threaded grinding wheel, while keeping the state of contact of the dressing tool with the flanks of the thread of the threaded grinding wheel.

A second aspect of the present invention is a gear grinding machine, comprising:

a moving mechanism on which a threaded grinding wheel having a thread spirally formed on an outer peripheral surface thereof is rotatably mounted, the moving mechanism being arranged to move the threaded grinding wheel along an X-direction being a direction in which the threaded grinding wheel moves toward and away from a work grinding position, a Z-direction being a vertical direction, and a Y-direction being a direction perpendicular to the X-direction and the Z-direction, and being also arranged to turn the threaded grinding wheel in a Y-Z plane;

an NC device for NC-controlling movement of the moving mechanism in order to control a position of the threaded grinding wheel mounted on the moving mechanism; and a rotary dressing device having a disk-shaped dressing tool, and arranged such that when the dressing tool is set at the work grinding position, the dressing tool contacts flanks of the thread of the threaded grinding wheel, while being rotationally driven, to perform dressing, the NC device exercising control in such a manner as to adjust positions of the threaded grinding wheel in the X-direction, the Y-direction and the Z-direction, and a turning position of the threaded grinding wheel in the Y-Z plane such that the dressing tool set at the work grinding position contacts the flanks of the thread of the threaded grinding wheel, move the threaded grinding wheel in the Y-direction by a distance corresponding to a lead of the spiral thread during one rotation of the threaded grinding wheel while keeping a state of contact of the dressing tool with the flanks of the thread of the threaded grinding wheel, and progressively change the positions of the threaded grinding wheel in the X-direction and the Z-direction such that a position of contact of the dressing tool with the flanks of the thread of the threaded grinding wheel progressively moves along a circumferential surface of the threaded grinding wheel in accordance with the rotation of the threaded grinding wheel, while keeping the state of contact of the dressing tool with the flanks of the thread of the threaded grinding wheel, whereby the threaded grinding wheel can be dressing-modified such that a wheel pressure angle of the thread formed spirally on the outer peripheral surface of the threaded grinding wheel is progressively changed along a spiral path beginning at a starting point of the thread toward an end point of the thread, wherein when a work disposed at the work grinding position is ground by the dressing-modified threaded grinding wheel, the NC device controls the rotation of the threaded grinding wheel such that the threaded grinding wheel is moved such that the thread of the threaded grinding wheel during rotation moves from one end side toward other end side along a tooth trace direction of the work while contacting a tooth flank of the work, and the starting point of the thread of the threaded grinding wheel contacts the tooth flank of the work on the one end side along the tooth trace direction of the work, while the end point of the thread of the threaded grinding wheel contacts the tooth flank of the work on the other end side along the tooth trace direction of the work.

A third aspect of the present invention is a method for dressing a threaded grinding wheel in a gear grinding machine, the gear grinding machine comprising:

a moving mechanism on which a threaded grinding wheel having a thread spirally formed on an outer peripheral surface thereof is rotatably mounted, the moving mechanism being arranged to move the threaded grinding wheel along an X-direction being a direction in which the threaded grinding wheel moves toward and away from a work grinding position, a Z-direction being a vertical direction, and a Y-direction being a direction perpendicular to the X-direction and the Z-direction, and being also arranged to turn the threaded grinding wheel in a Y-Z plane; and a rotary dressing device having a disk-shaped dressing tool, and arranged such that when the dressing tool is set at the work grinding position, the dressing tool contacts flanks of the thread of the threaded grinding wheel, while being rotationally driven, to perform dressing, the method comprising:

adjusting positions of the threaded grinding wheel in the X-direction, the Y-direction and the Z-direction, and a turning position of the threaded grinding wheel in the Y-Z plane such that the dressing tool contacts the flanks of the thread of the threaded grinding wheel;

moving the threaded grinding wheel in the Y-direction by a distance corresponding to a lead of the spiral thread during one rotation of the threaded grinding wheel while keeping a state of contact of the dressing tool with the flanks of the thread of the threaded grinding wheel; and progressively changing the positions of the threaded grinding wheel in the X-direction and the Z-direction such that a position of contact of the dressing tool with the flanks of the thread of the threaded grinding wheel progressively moves along a circumferential surface of the threaded grinding wheel in accordance with the rotation of the threaded grinding wheel, while keeping the state of contact of the dressing tool with the flanks of the thread of the threaded grinding wheel.

A fourth aspect of the present invention is a method for grinding a work in a gear grinding machine, the gear grinding machine comprising:

a moving mechanism on which a threaded grinding wheel having a thread spirally formed on an outer peripheral surface thereof is rotatably mounted, the moving mechanism being arranged to move the threaded grinding wheel along an X-direction being a direction in which the threaded grinding wheel moves toward and away from a work grinding position, a Z-direction being a vertical direction, and a Y-direction being a direction perpendicular to the X-direction and the Z-direction, and being also arranged to turn the threaded grinding wheel in a Y-Z plane; and a rotary dressing device having a disk-shaped dressing tool, and arranged such that when the dressing tool is set at the work grinding position, the dressing tool contacts flanks of the thread of the threaded grinding wheel, while being rotationally driven, to perform dressing, the method comprising:

adjusting positions of the threaded grinding wheel in the X-direction, the Y-direction and the Z-direction, and a turning position of the threaded grinding wheel in the Y-Z plane such that the dressing tool set at the work grinding position contacts the flanks of the thread of the threaded grinding wheel;

moving the threaded grinding wheel in the Y-direction by a distance corresponding to a lead of the spiral thread during one rotation of the threaded grinding wheel while keeping a state of contact of the dressing tool with the flanks of the thread of the threaded grinding wheel, and progressively changing the positions of the threaded grinding wheel in the X-direction and the Z-direction such that a position of contact of the dressing tool with the flanks of the thread of the threaded grinding wheel progressively moves along a circumferential surface of the threaded grinding wheel in accordance with the rotation of the threaded grinding wheel, while keeping the state of contact of the dressing tool with the flanks of the thread of the threaded grinding wheel, thereby dressing-modifying the threaded grinding wheel such that a wheel pressure angle of the thread formed spirally on the outer peripheral surface of the threaded grinding wheel is progressively changed along a spiral path beginning at a starting point of the thread toward an end point of the thread, and when grinding a work disposed at the work grinding position by the dressing-modified threaded grinding wheel, rotating the threaded grinding wheel such that the threaded grinding wheel is moved such that the thread of the threaded grinding wheel during rotation moves from one end side toward other end side along a tooth trace direction of the work while contacting a tooth flank of the work, and the starting point of the thread of the threaded grinding wheel contacts the tooth flank of the work on the one end side along the tooth trace direction of the work, while the end point of the thread of the threaded grinding wheel contacts the tooth flank of the work on the other end side along the tooth trace direction of the work.

According to the present invention, the position of the threaded grinding wheel is NC-controlled, whereby the threaded grinding wheel is dressed in contact with the dressing tool of the rotary dressing device. As a result, the wheel pressure angle of the thread, which is formed spirally on the circumferential surface of the threaded grinding wheel, can be progressively changed (gradually increased or gradually decreased) along the spiral path beginning at the starting point of the thread toward the end point of the thread.

As described above, the wheel pressure angle can be continuously changed by dressing-modification of the threaded grinding wheel. The use of the threaded grinding wheel having such a continuously changed wheel pressure angle makes it possible to make optimal bias tooth flank modification of the helical gear (work).

That is, the threaded grinding wheel is dressing-modified such that the wheel pressure angle of the threaded grinding wheel is progressively changed along the spiral path beginning at the starting point of the thread toward the end point of the thread. When the helical gear (work) disposed at the work grinding position is ground with the use of the threaded grinding wheel subjected to such dressing modification, the rotation of the threaded grinding wheel is controlled such that (1) the threaded grinding wheel is moved such that the thread of the threaded grinding wheel during rotation moves from one end side toward the other end side along the tooth trace direction of the helical gear while contacting the tooth flank of the helical gear (work), and (2) the starting point of the thread of the threaded grinding wheel contacts the tooth flank of the helical gear on the one end side along the tooth trace direction of the helical gear (work), while the end point of the thread of the threaded grinding wheel contacts the tooth flank of the helical gear on the other end side along the tooth trace direction of the helical gear (work).

By performing such grinding, bias modification can be imparted which allows the pressure angle of the tooth flank of the helical gear (work) progressively changes in a path from one end side toward the other end side along the tooth trace direction in accordance with changes in the pressure angle of the threaded grinding wheel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6(a) is an explanation drawing showing the state of an embodiment of the present invention;

FIG. 6(b) is an explanation drawing showing the state of the embodiment; and

FIG. 6(c) is an explanation drawing showing the state of the embodiment.

DETAILED DESCRIPTION OF THE INVENTION

First of all, the features and general actions of a gear grinding machine, to which the present invention has been applied, will be described with reference to FIGS. 1 to 5(a), 5(b).

Figure 1:
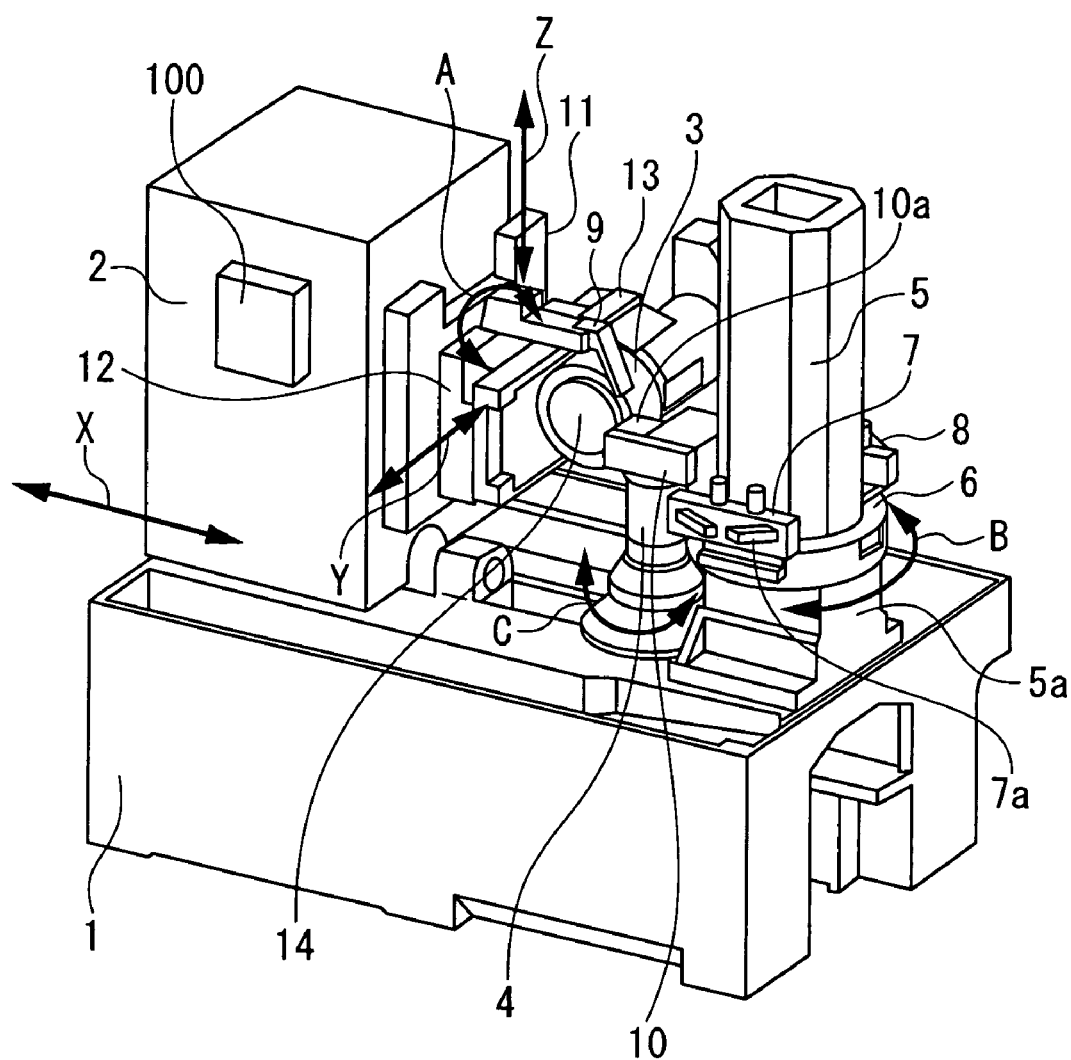
FIG. 1 is a perspective view showing a gear grinding machine.

FIG. 1 is a perspective view of a gear grinding machine according to an embodiment of the present invention having a threaded grinding wheel (worm grinding wheel) 3 mounted thereon. FIG. 1 illustrates a state in which the threaded grinding wheel 3 is dressed (ground for regeneration) by a pair of dressing tools 10a and 10b provided in a rotary dressing device 10. The threaded grinding wheel 3 of an annular shape has a rack tooth (a thread formed in a spiral shape) on the outer peripheral surface thereof, and this rack tooth meshes with a work (gear to be ground) W to carry out gear grinding.

Figure 2A:
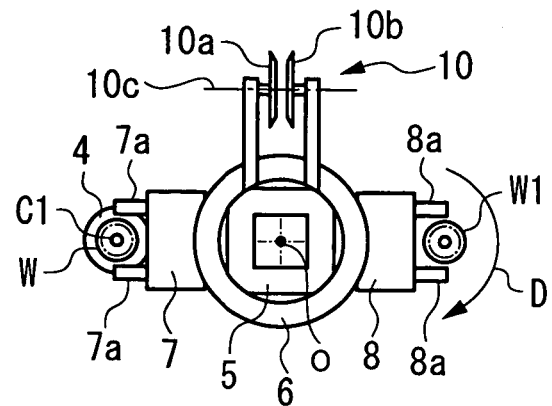
FIG. 2(a) is a plan view showing the surroundings of a counter column in the gear grinding machine.
Figure 2B:
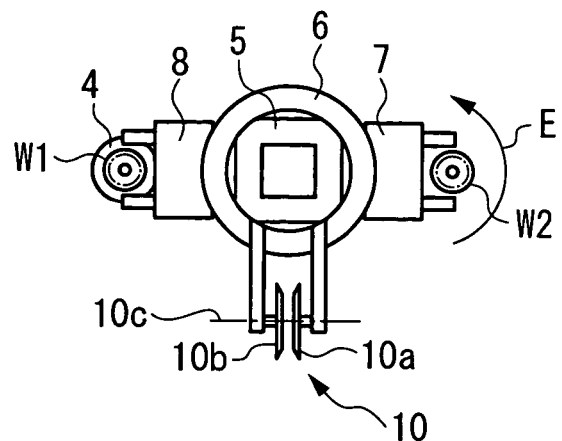
FIG. 2(b) is a plan view showing the surroundings of the counter column in the gear grinding machine.
Figure 2C:
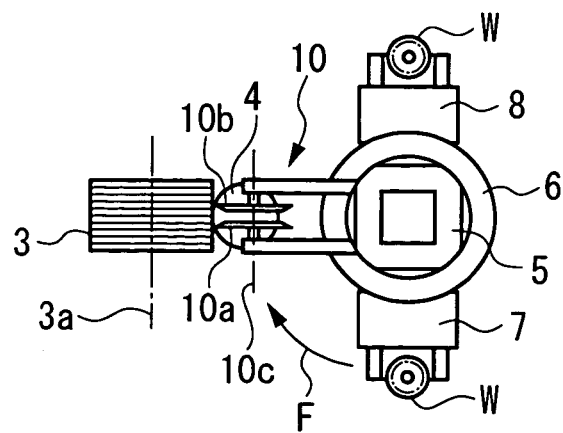
FIG. 2(c) is a plan view showing the surroundings of the counter column in the gear grinding machine.

FIGS. 2(a) to 2(c) are explanation drawings of the surroundings of a counter column 5, as viewed from above, which is a tailstock for supporting an end of the work. FIGS. 2(a) and 2(b) show actions for carrying the work W into and out of a site on a table 4. FIG. 2(c) shows the state of dressing.

Figure 3:
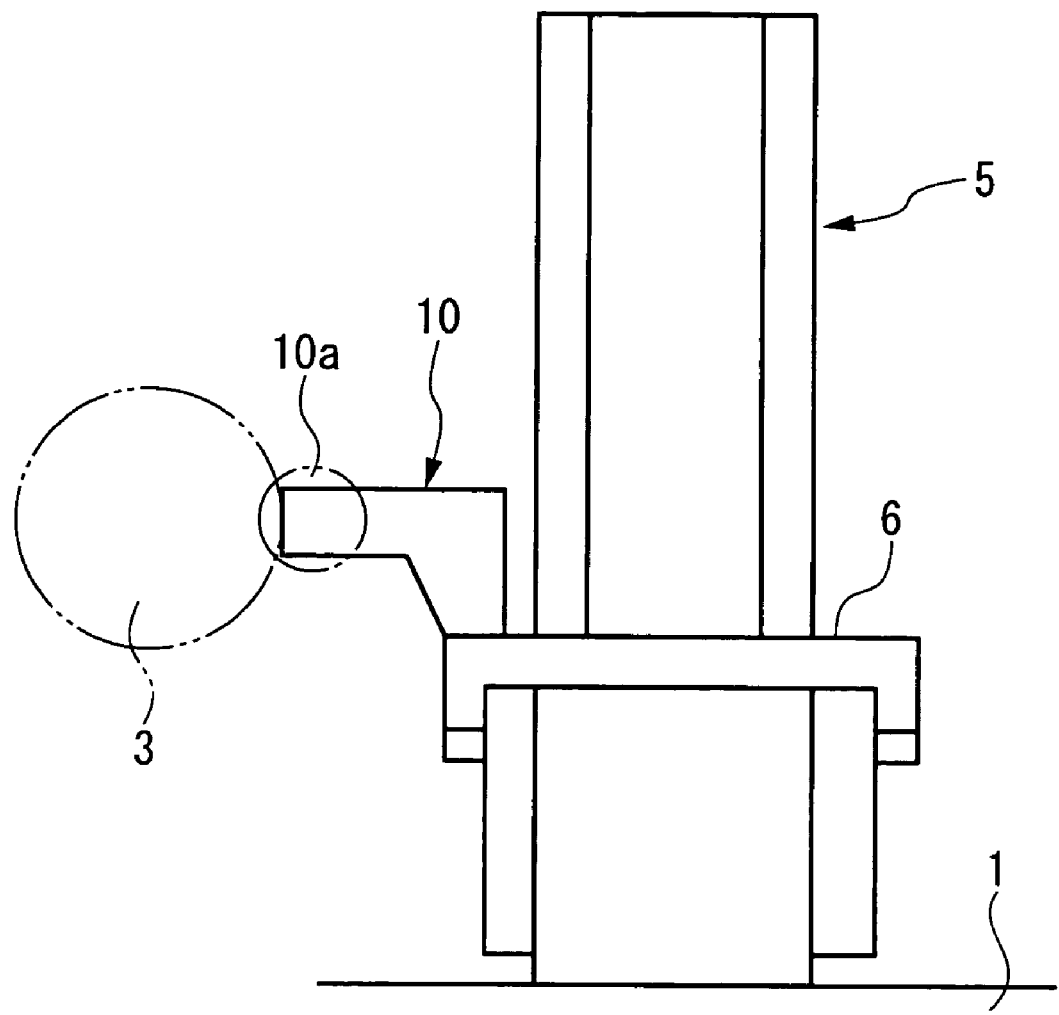
FIG. 3 is a side view showing the surroundings of the counter column in the gear grinding machine.

FIG. 3 is a side view of the counter column (tailstock) 5.

Figure 4:
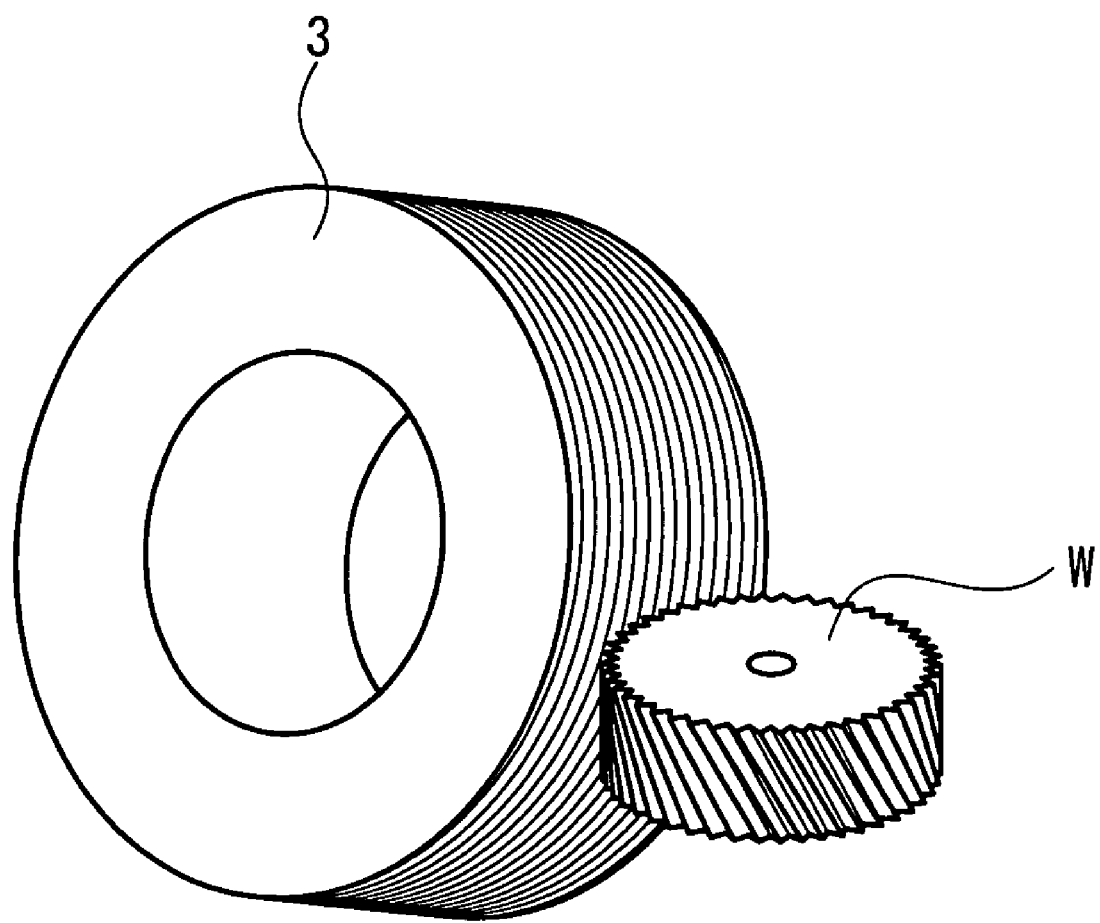
FIG. 4 is a perspective view showing the state of grinding a gear.

FIG. 4 is a perspective view showing a state in which the threaded grinding wheel 3 and the work W mesh together for gear grinding. As shown in FIG. 4, the thread is formed in a spiral shape on the outer peripheral surface of the threaded grinding wheel 3.

Figure 5A:
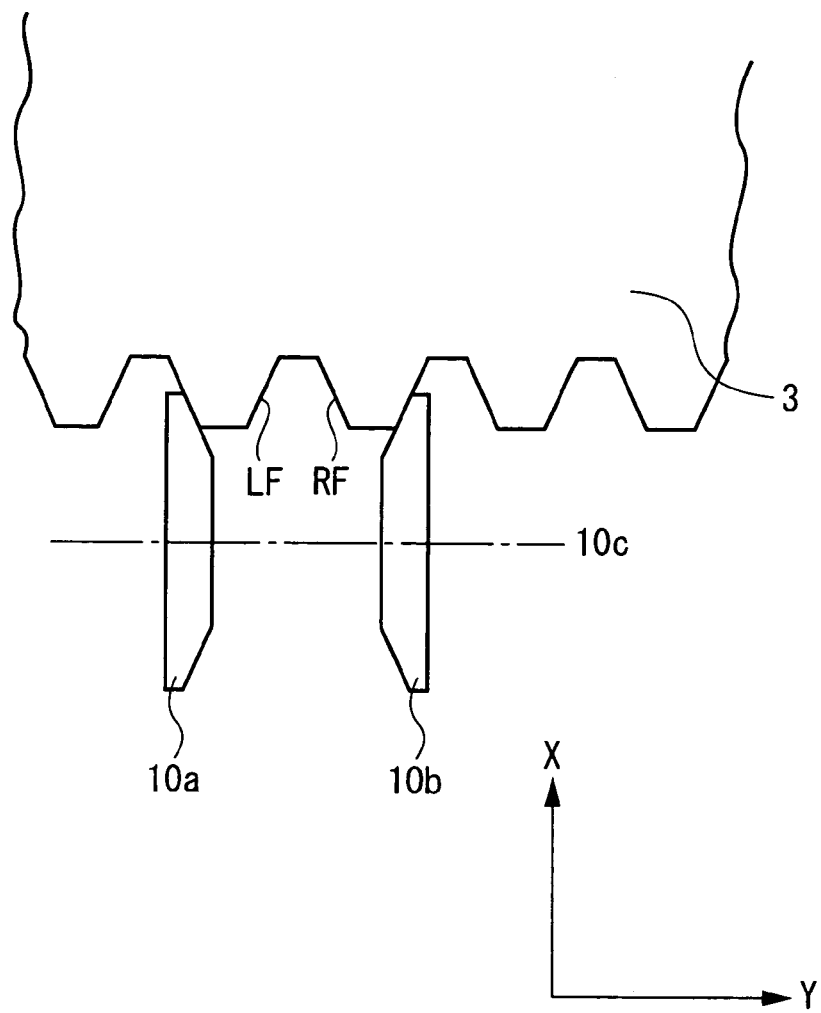
FIG. 5(a) is a schematic view showing the state of dressing.
Figure 5B:
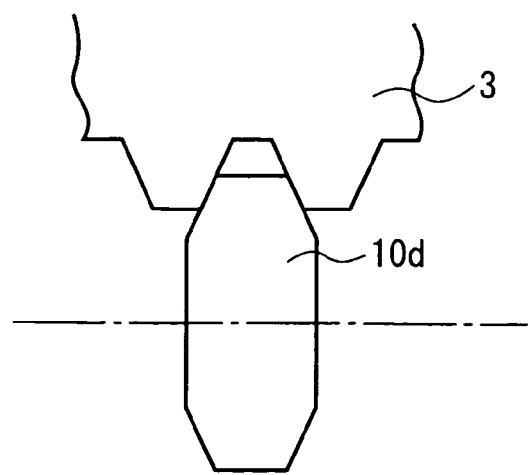
FIG. 5(b) is a schematic view showing the state of dressing.

FIGS. 5(a) and 5(b) are schematic views showing the state of dressing.

In FIG. 1, the numeral 1 denotes a bed, 2 denotes a column, 3 denotes the threaded grinding wheel for grinding the work, 4 denotes the table on which the work is placed and held, 5 denotes the counter column (tailstock) erected on the bed 1, 6 denotes a swivel ring (annular member) swingably provided on the outer periphery of a lower part of the counter column 5, 7 and 8 denote grippers for carrying-in and carrying-out of the work, and 10 denotes the rotary dressing device for dressing the threaded grinding wheel 3.

The table 4 is provided at a position facing the column 2 (i.e., a work grinding position). The column 2 moves on the bed 1 toward and away from a first axis C1 (table 4) shown in FIG. 2(a) (namely, the column 2 slides in an X-direction). The column 2 has a grinding spindle 14 as a grinding wheel shaft for mounting the threaded grinding wheel 3. The table 4 rotates in directions of arrows C about the first axis C1 shown in FIG. 2(a).

The counter column 5 has the function of pressing the work, placed on the table 4, from above, and has a tailstock instrument (not shown) which ascends and descends in an up-and-down direction above the table 4 to press the work from above.

As shown in FIG. 2(a), the swivel ring (annular member) 6, which is turned about a second axis 0 in directions of arrows B (FIG. 1) by a drive means (not shown), is provided on the outer periphery of the counter column 5. The pair of grippers 7 and 8, which are holders of the work, and the rotary dressing device 10 are provided on the swivel ring 6.

The pair of grippers 7 and 8 are provided symmetrically with respect to the second axis 0 for carrying the work W into and out of the site on the table 4. The grippers 7 and 8 have such a mechanism that a pair of opening and closing forks 7a, 7a or 8a, 8a grip the work W from both sides of it, and hold it.

The swivel ring 6 is desirably provided on the outer periphery of the lower part of the counter column 5 in consideration of a height which makes it easy for the grippers 7, 8 to carry the work W into and out of the site on the table 4.

The rotary dressing device 10 is provided between the grippers 7 and 8, and is preferably provided at a central (90-degree) position between the grippers 7 and 8, with the second axis 0 as the center.

The rotary dressing device 10 is furnished with the pair of disk-shaped dressing tools 10a and 10b which are rotationally driven about a dresser axis 10c in a vertical plane.

The column 2 has, on a side surface (front surface) thereof facing the table 4, a vertical slide 11 slidable parallel to the first axis C1 (i.e., in a Z-direction), a swivel head 12 capable of pivotally turning on the front surface of the vertical slide 11 in directions of arrows A (i.e., capable of turning about an X-axis and capable of turning in a Y-Z plane), and a grinding slider 13 sliding on the front surface of the swivel head 12 in a direction perpendicular to the first axis C1 (i.e., in a Y-direction). The above pivotal turns in the A-direction mean motions which tilt the whole of the grinding spindle 14. The grinding spindle 14 rotates about a grinding wheel axis 3a, thereby enabling the work W to be ground by the threaded grinding wheel 3.

The bed 1, the column 2, the vertical slide 11, the swivel head 12, the grinding slider 13, and the grinding spindle 14 constitute a moving mechanism, and the respective portions of this moving mechanism have their moving positions NC-controlled by an NC device 20.

The swivel head 12 is provided with a coolant nozzle 9. During grinding, a grinding fluid ejected from the coolant nozzle 9 is supplied to the work W and the threaded grinding wheel 3 to ensure smoothness of grinding, exclusion of grinding swarf, and cooling.

The above-mentioned movements in the directions of X, Y, Z, A and C, and the rotational driving of the threaded grinding wheel 3 by the grinding spindle 14 are NC-controlled by the NC device 20, whereby the threaded grinding wheel 3 grinds the work W on the table 4.

The carry-in, carry-out, and grinding actions for the work W will be described based on FIGS. 2(a), 2(b) and 2(c).

FIG. 2(a) is a view showing a state in which the work W is carried into the site on table 4 by the gripper 7, and the work W1 to be ground next is gripped by the gripper 8.

The gripper 7 is lowered by a predetermined distance by a moving means (not shown) to install the work W at a work mounting instrument (work arbor) on the table 4. After gripping by the gripper 7 is released, the work W is fixed to and supported on the work arbor by a clamping device (not shown). Then, movements in the directions of X, Y, Z, A and C, and the rotational driving of the threaded grinding wheel 3 are NC-controlled, whereby the threaded grinding wheel 3 grinds the work W to produce a gear W2. FIG. 4 shows the state of the threaded grinding wheel 3 and the work W during grinding.

Then, the fixing and support of the gear W2 on the work arbor are released, and the gear W2 is gripped by the gripper 7. The gripper 7 is raised by a predetermined distance by the moving means to separate the gear W2 from the work arbor. Then, the swivel ring 6 is rotated clockwise (in a direction of an arrow D) through 180 degrees to attain the state shown in FIG. 2(b). At this time, the gripper 8 grips the work W1 to be ground next, and the gripper 8 carries the work W1 into the site on the table 4, while the gripper 7 carries the completed gear W2 out.

By repeating the actions shown in FIGS. 2(a) and 2(b) alternately, several tens of gears are produced continuously. Then, the swivel ring 6 is turned from the state of FIG. 2(b) clockwise through 90 degrees in a direction of an arrow F to attain the state shown in FIG. 2(c) and FIG. 3. As shown in FIG. 2(c) and FIG. 3, the rotary dressing device 10 is brought face-to-face with the threaded grinding wheel 3. The dressing tools 10a, 10b are rotationally driven in a vertical plane about the dresser axis 10c. Further, the movements of the threaded grinding wheel 3 in the directions of X, Y, Z and A and the rotational driving of the threaded grinding wheel 3 are NC-controlled by the NC device 20 in the same manner as for grinding of the work W, whereby the threaded grinding wheel 3 is ground for regeneration by the dressing device 10.

The timing of dressing of the threaded grinding wheel 3 by the rotary dressing device 10 is determined in the following manner: Before grinding is performed, the number of the works W to be ground continuously by the threaded grinding wheel 3 is set beforehand, as a predetermined set number, in the NC device 20 of the gear grinding machine. By so doing, the actions shown in FIGS. 2(a) and 2(b) are repeated alternately so that the threaded grinding wheel 3 grinds the predetermined set number of the works W continuously, whereafter the swivel ring 6 is turned and brought to the state of FIG. 2(c). As a result, the rotary dressing device 10 faces the threaded grinding wheel 3, making it possible for the rotary dressing device 10 to dress the threaded grinding wheel 3.

Dressing is performed by rotationally driving the dressing tools 10a and 10b in a vertical plane about the dresser axis 10c, and NC-controlling the movements of the threaded grinding wheel 3 in the directions of X, Y, Z and A and the rotational driving of the threaded grinding wheel 3.

In this manner, the disk-shaped dressing tools 10a and 10b being rotationally driven are brought into contact with the flanks of the thread of the threaded grinding wheel 3 being rotated, whereby dressing of the threaded grinding wheel 3 can be carried out.

FIG. 5(a) schematically shows a state in which the threaded grinding wheel 3 is dressed by the dressing tools 10a, 10b.

In performing dressing, the position of the rotary dressing device 10 (i.e., dressing tools 10a, 10b) is fixed. In order that the dressing tools 10a, 10b contact the flanks of the thread of the threaded grinding wheel 3, the threaded grinding wheel 3 is located at a predetermined position in an orthogonal coordinate system (in directions along the X-axis, the Y-axis, and the Z-axis), and the threaded grinding wheel 3 is turned through a predetermined angle in the direction of the arrows A. At this time, the position of the threaded grinding wheel 3 (directions along the X-, Y-, and Z-axes, and the position of turning in the A direction) is adjusted, whereby the wheel pressure angle of the threaded grinding wheel 3 to be dressed by the dressing tools 10a, 10b can be changed.

As described above, in order to attain the predetermined wheel pressure angle, the position control of the threaded grinding wheel 3 is exercised to bring the dressing tools 10a, 10b into contact with the flanks of the thread of the threaded grinding wheel 3, and with this positional state being kept, the threaded grinding wheel 3 is rotationally driven. Here, during one rotation of the threaded grinding wheel 3, the threaded grinding wheel 3 is moved in the Y-direction by a distance corresponding to the lead of the thread of the threaded grinding wheel 3. By so doing, dressing takes place such that at all portions along a spiral path beginning at the starting point of the thread (one end of the spiral of the thread formed in a spiral shape) toward the end point of the thread (the other end of the spiral of the thread formed in the spiral shape), the wheel pressure angle of the thread becomes the predetermined wheel pressure angle.

After all, "the positions of the dressing tools 10a, 10b are fixed, while the orthogonal coordinate position and the turning angle in the direction of the arrow A of the threaded grinding wheel 3 are changed", in order to attain a state equivalent to the state in which "the position of the threaded grinding wheel 3 is fixed, while the dressing tools 10a, 10b are turned about the Z-axis". By this measure, the wheel pressure angle can be changed.

A single dressing tool 10d as shown in FIG. 5(b) can be employed. This dressing tool 10d can perform dressing upon contact with the right and left flanks RF and LF of the threaded grinding wheel 3, as do the pair of dressing tools 10a and 10b.

EMBODIMENT 1

An embodiment of the present invention applied to the gear grinding machine shown in FIGS. 1 to 5(a), 5(b) will be described with reference to FIGS. 6(a) to 6(c).

According to this embodiment, the threaded grinding wheel 3 is dressed by the rotary dressing device 10, whereby the wheel pressure angle of the thread, which is formed spirally on the circumferential surface of the threaded grinding wheel 3, is progressively changed (gradually increased or gradually decreased) along a spiral path beginning at the starting point of the thread toward the end point of the thread.

In the present embodiment, the position of the rotary dressing device 10 is fixed, regardless of the progress of dressing, as shown in FIGS. 6(a), 6(b), and 6(c). Although the position of the rotary dressing device is fixed, the dressing tools 10a, 10b rotate in a vertical plane about the dresser axis 10c. The position of the threaded grinding wheel 3 is controlled by NC control using the NC device 20, as will be described below.

First, as shown in FIG. 6(a), the positions of the threaded grinding wheel 3 in the X-, Y- and Z-directions and its turning position in the YZ-plane (turning position in the A-direction) are adjusted such that a somewhat lower surface of the outer peripheral surface of the threaded grinding wheel 3 contacts the dressing tools 10a, 10b.

Concretely, adjustment is made such that the starting point of the thread formed spirally on the circumferential surface of the threaded grinding wheel 3 contacts the dressing tools 10a, 10b.

At this time, the positions of the threaded grinding wheel 3 in the X-, Y- and Z-directions and its turning position in the YZ-plane (turning position in the A-direction) are adjusted so that the wheel pressure angle formed at the flanks of the thread of the threaded grinding wheel 3 by dressing upon contact of the dressing tools 10a, 10b with the thread reaches a preset angle.

Then, with the dressing tools 10a, 10b kept in contact with the thread of the threaded grinding wheel 3 in the above-mentioned manner, two types of moving control over the threaded grinding wheel 3 will be performed simultaneously as described below.

In first moving control, with the dressing tools 10a, 10b kept in contact with the thread of the threaded grinding wheel 3 in the above-mentioned manner, the threaded grinding wheel 3 is moved in the Y-direction in synchronism with the rotation of the threaded grinding wheel 3. Concretely, during one rotation of the threaded grinding wheel 3, the threaded grinding wheel 3 is moved in the Y-direction by a distance corresponding to the lead of the spiral thread.

In second moving control, with the dressing tools 10a, 10b kept in contact with the thread of the threaded grinding wheel 3 in the above-mentioned manner, the positions of the threaded grinding wheel 3 in the X- and Z-directions are progressively changed so that the positions of contact of the dressing tools 10a, 10b with the flanks of the thread of the threaded grinding wheel 3 progressively move along the circumferential surface of the threaded grinding wheel 3 in accordance with the rotation of the threaded grinding wheel 3.

That is, control is exercised such that the positions of the threaded grinding wheel 3 in the X- and Z-directions are progressively changed so that the contact of the dressing tools 10a, 10b with the flanks of the thread of the threaded grinding wheel 3 changes from the initial state shown in FIG. 6(a) to the state shown in FIG. 6(b), and further to the final state shown in FIG. 6(c).

In this case, changes in the position of the threaded grinding wheel 3 in the X- and Z-directions are controlled such that in the initial state shown in FIG. 6(a), the starting point of the thread formed spirally on the circumferential surface of the threaded grinding wheel 3 contacts the dressing tools 10a, 10b, and in the final state shown in FIG. 6(c), the end point of the thread formed spirally on the circumferential surface of the threaded grinding wheel 3 contacts the dressing tools 10a, 10b.

When the positions of the dressing tools 10a, 10b in contact with the flanks of the thread of the threaded grinding wheel 3 progressively move along the circumferential surface of the threaded grinding wheel 3, the wheel pressure angle of the thread dressed by the dressing tools 10a, 10b progressively changes along the spiral path beginning at the starting point of the thread toward the end point of the thread.

For example, as compared with the wheel pressure angle of the thread at the starting point, which is dressed in the state of FIG. 6(a), the wheel pressure angle of the thread at the end point, which is dressed in the state of FIG. 6(c) is large. This means that the pressure angle of the thread gradually increases along the spiral path beginning at the starting point of the thread toward the end point of the thread, although this is dependent on the direction of the inclination of the thread formed in the threaded grinding wheel 3.

If the direction of the inclination of the thread formed in the threaded grinding wheel 3 is opposite, the pressure angle of the thread gradually decreases along the spiral path beginning at the starting point of the thread toward the end point of the thread.

The reason is that even when the positions of the dressing tools 10a, 10b in contact with the flanks of the thread of the threaded grinding wheel 3 are the same in the Y-direction, the amount of dressing changes because of a twist in the thread, if these positions are different along the circumference of the threaded grinding wheel 3.

The above-described positional control over the threaded grinding wheel 3 makes it possible to perform dressing by which the wheel pressure angle of the thread, which is formed spirally on the circumferential surface of the threaded grinding wheel 3, is progressively changed (gradually increased or gradually decreased) along the spiral path beginning at the starting point of the thread toward the end point of the thread.

Moreover, if a helical gear is ground by the so dressed threaded grinding wheel 3, bias tooth flank modification can be made for the helical gear.

That is, the wheel pressure angle can be changed continuously by dressing-modifying the threaded grinding wheel 3. The use of the threaded grinding wheel 3 having such a continuously changed wheel pressure angle can apply optimal bias tooth flank modification to the helical gear (work).

In detail, when the helical gear (work) disposed at the work grinding position is ground with the use of the threaded grinding wheel 3 dressing-modified to have the wheel pressure angle which is progressively changed along the spiral path beginning at the starting point of the thread toward the end point of the thread, the rotation of the threaded grinding wheel 3 is controlled in the following manner:

(1) The threaded grinding wheel 3 is moved such that the thread of the threaded grinding wheel 3 during rotation moves from one end side toward the other end side along the tooth trace direction of the helical gear while contacting the tooth flank of the helical gear (work).

(2) Moreover, the starting point of the thread of the threaded grinding wheel 3 contacts the tooth flank of the helical gear on the one end side along the tooth trace direction of the helical gear (work), while the end point of the thread of the threaded grinding wheel 3 contacts the tooth flank of the helical gear on the other end side along the tooth trace direction of the helical gear (work).

By performing such grinding, bias modification can be imparted which allows the pressure angle of the tooth flank of the helical gear (work) progressively changes from one end side toward the other end side along the tooth trace direction in accordance with changes in the pressure angle of the threaded grinding wheel 3.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gear grinding machine, comprising:
   a moving mechanism on which a threaded grinding wheel having a thread spirally formed on an outer peripheral surface thereof is rotatably mounted, the moving mechanism being arranged to move the threaded grinding wheel along an X-direction being a direction in which the threaded grinding wheel moves toward and away from a work grinding position, a Z-direction being a vertical direction, and a Y-direction being a direction perpendicular to the X-direction and the Z-direction, and being also arranged to turn the threaded grinding wheel in a Y-Z plane;
   an NC device for NC-controlling movement of the moving mechanism in order to control a position of the threaded grinding wheel mounted on the moving mechanism; and
   a rotary dressing device having a disk-shaped dressing tool, and arranged such that when the dressing tool is set at the work grinding position, the dressing tool contacts flanks of the thread of the threaded grinding wheel, while being rotationally driven, to perform dressing,
   wherein the NC device exercises control in such a manner as to
   adjust positions of the threaded grinding wheel in the X-direction, the Y-direction and the Z-direction, and a turning position of the threaded grinding wheel in the Y-Z plane such that the dressing tool contacts the flanks of the thread of the threaded grinding wheel,
   move the threaded grinding wheel in the Y-direction by a distance corresponding to a lead of the spiral thread during one rotation of the threaded grinding wheel while keeping a state of contact of the dressing tool with the flanks of the thread of the threaded grinding wheel, and
   progressively change the positions of the threaded grinding wheel in the X-direction and the Z-direction such that a position of contact of the dressing tool with the flanks of the thread of the threaded grinding wheel progressively moves along a circumferential surface of the threaded grinding wheel in accordance with the rotation of the threaded grinding wheel, while keeping the state of contact of the dressing tool with the flanks of the thread of the threaded grinding wheel.

2. A gear grinding machine, comprising:
   a moving mechanism on which a threaded grinding wheel having a thread spirally formed on an outer peripheral surface thereof is rotatably mounted, the moving mechanism being arranged to move the threaded grinding wheel along an X-direction being a direction in which the threaded grinding wheel moves toward and away from a work grinding position, a Z-direction being a vertical direction, and a Y-direction being a direction perpendicular to the X-direction and the Z-direction, and being also arranged to turn the threaded grinding wheel in a Y-Z plane;
   an NC device for NC-controlling movement of the moving mechanism in order to control a position of the threaded grinding wheel mounted on the moving mechanism; and
   a rotary dressing device having a disk-shaped dressing tool, and arranged such that when the dressing tool is set at the work grinding position, the dressing tool contacts flanks of the thread of the threaded grinding wheel, while being rotationally driven, to perform dressing,
   the NC device exercising control in such a manner as to
   adjust positions of the threaded grinding wheel in the X-direction, the Y-direction and the Z-direction, and a turning position of the threaded grinding wheel in the Y-Z plane such that the dressing tool set at the work grinding position contacts the flanks of the thread of the threaded grinding wheel,
   move the threaded grinding wheel in the Y-direction by a distance corresponding to a lead of the spiral thread during one rotation of the threaded grinding wheel while keeping a state of contact of the dressing tool with the flanks of the thread of the threaded grinding wheel, and
   progressively change the positions of the threaded grinding wheel in the X-direction and the Z-direction such that a position of contact of the dressing tool with the flanks of the thread of the threaded grinding wheel progressively moves along a circumferential surface of the threaded grinding wheel in accordance with the rotation of the threaded grinding wheel, while keeping the state of contact of the dressing tool with the flanks of the thread of the threaded grinding wheel,
   whereby the threaded grinding wheel can be dressing-modified such that a wheel pressure angle of the thread formed spirally on the outer peripheral surface of the threaded grinding wheel is progressively changed along a spiral path beginning at a starting point of the thread toward an end point of the thread,
   wherein when a work disposed at the work grinding position is ground by the dressing-modified threaded grinding wheel, the NC device controls the rotation of the threaded grinding wheel such that
   the threaded grinding wheel is moved such that the thread of the threaded grinding wheel during rotation moves from one end side toward other end side along a tooth trace direction of the work while contacting a tooth flank of the work, and
   the starting point of the thread of the threaded grinding wheel contacts the tooth flank of the work on the one end side along the tooth trace direction of the work, while the end point of the thread of the threaded grinding wheel contacts the tooth flank of the work on the other end side along the tooth trace direction of the work.

3. A method for dressing a threaded grinding wheel in a gear grinding machine, the gear grinding machine comprising:
   a moving mechanism on which a threaded grinding wheel having a thread spirally formed on an outer peripheral surface thereof is rotatably mounted, the moving mechanism being arranged to move the threaded grinding wheel along an X-direction being a direction in which the threaded grinding wheel moves toward and away from a work grinding position, a Z-direction being a vertical direction, and a Y-direction being a direction perpendicular to the X-direction and the Z-direction, and being also arranged to turn the threaded grinding wheel in a Y-Z plane; and a rotary dressing device having a disk-shaped dressing tool, and arranged such that when the dressing tool is set at the work grinding position, the dressing tool contacts flanks of the thread of the threaded grinding wheel, while being rotationally driven, to perform dressing, the method comprising:

adjusting positions of the threaded grinding wheel in the X-direction, the Y-direction and the Z-direction, and a turning position of the threaded grinding wheel in the Y-Z plane such that the dressing tool contacts the flanks of the thread of the threaded grinding wheel;

moving the threaded grinding wheel in the Y-direction by a distance corresponding to a lead of the spiral thread during one rotation of the threaded grinding wheel while keeping a state of contact of the dressing tool with the flanks of the thread of the threaded grinding wheel; and progressively changing the positions of the threaded grinding wheel in the X-direction and the Z-direction such that a position of contact of the dressing tool with the flanks of the thread of the threaded grinding wheel progressively moves along a circumferential surface of the threaded grinding wheel in accordance with the rotation of the threaded grinding wheel, while keeping the state of contact of the dressing tool with the flanks of the thread of the threaded grinding wheel.

4. A method for grinding a work in a gear grinding machine, the gear grinding machine comprising:

a moving mechanism on which a threaded grinding wheel having a thread spirally formed on an outer peripheral surface thereof is rotatably mounted, the moving mechanism being arranged to move the threaded grinding wheel along an X-direction being a direction in which the threaded grinding wheel moves toward and away from a work grinding position, a Z-direction being a vertical direction, and a Y-direction being a direction perpendicular to the X-direction and the Z-direction, and being also arranged to turn the threaded grinding wheel in a Y-Z plane; and a rotary dressing device having a disk-shaped dressing tool, and arranged such that when the dressing tool is set at the work grinding position, the dressing tool contacts flanks of the thread of the threaded grinding wheel, while being rotationally driven, to perform dressing, the method comprising:

adjusting positions of the threaded grinding wheel in the X-direction, the Y-direction and the Z-direction, and a turning position of the threaded grinding wheel in the Y-Z plane such that the dressing tool set at the work grinding position contacts the flanks of the thread of the threaded grinding wheel;

moving the threaded grinding wheel in the Y-direction by a distance corresponding to a lead of the spiral thread during one rotation of the threaded grinding wheel while keeping a state of contact of the dressing tool with the flanks of the thread of the threaded grinding wheel, and progressively changing the positions of the threaded grinding wheel in the X-direction and the Z-direction such that a position of contact of the dressing tool with the flanks of the thread of the threaded grinding wheel progressively moves along a circumferential surface of the threaded grinding wheel in accordance with the rotation of the threaded grinding wheel, while keeping the state of contact of the dressing tool with the flanks of the thread of the threaded grinding wheel, thereby dressing-modifying the threaded grinding wheel such that a wheel pressure angle of the thread formed spirally on the outer peripheral surface of the threaded grinding wheel is progressively changed along a spiral path beginning at a starting point of the thread toward an end point of the thread, and when grinding a work disposed at the work grinding position by the dressing-modified threaded grinding wheel, rotating the threaded grinding wheel such that the threaded grinding wheel is moved such that the thread of the threaded grinding wheel during rotation moves from one end side toward other end side along a tooth trace direction of the work while contacting a tooth flank of the work, and the starting point of the thread of the threaded grinding wheel contacts the tooth flank of the work on the one end side along the tooth trace direction of the work, while the end point of the thread of the threaded grinding wheel contacts the tooth flank of the work on the other end side along the tooth trace direction of the work.

* * * * *